United States Patent
Hsu et al.

(10) Patent No.: US 8,937,873 B2
(45) Date of Patent: Jan. 20, 2015

(54) METHOD AND APPARATUS FOR GENERATING FORBIDDEN CHANNEL LIST

(75) Inventors: Chia Hsiang Hsu, Hsinchu County (TW); Tsung Yuan Pan, Hsinchu County (TW)

(73) Assignee: Mediatek Inc., Hsinchu (TW)

( * ) Notice: Subject to any disclaimer, the term of this patent is extended or adjusted under 35 U.S.C. 154(b) by 548 days.

(21) Appl. No.: 13/030,610

(22) Filed: Feb. 18, 2011

(65) Prior Publication Data

US 2011/0205921 A1 Aug. 25, 2011

(30) Foreign Application Priority Data

Feb. 22, 2010 (TW) .............................. 99104934 A

(51) Int. Cl.
*H04J 1/16* (2006.01)
*H04L 12/26* (2006.01)
*H04W 48/16* (2009.01)
*H04W 48/12* (2009.01)
*H04W 84/18* (2009.01)

(52) U.S. Cl.
CPC ........... *H04L 43/0829* (2013.01); *H04W 48/16* (2013.01); *H04W 48/12* (2013.01); *H04W 84/18* (2013.01)
USPC .............................. 370/252; 370/332; 455/69

(58) Field of Classification Search
USPC .............................. 370/252, 332, 431; 455/69
See application file for complete search history.

(56) References Cited

U.S. PATENT DOCUMENTS

| | | | |
|---|---|---|---|
| 7,917,176 B2* | 3/2011 | Khojastepour et al. | 455/562.1 |
| 7,978,623 B1* | 7/2011 | Kotecha | 370/252 |
| 8,036,164 B1* | 10/2011 | Winters et al. | 370/329 |
| 8,073,486 B2* | 12/2011 | Mundarath et al. | 455/553.1 |
| 8,150,328 B2* | 4/2012 | Chaudhri et al. | 455/67.11 |
| 2003/0112880 A1* | 6/2003 | Walton et al. | 375/260 |
| 2004/0248580 A1* | 12/2004 | Backes et al. | 455/450 |
| 2010/0304691 A1* | 12/2010 | Goransson et al. | 455/69 |

FOREIGN PATENT DOCUMENTS

| | | |
|---|---|---|
| CN | 1778124 | 5/2006 |
| TW | 200611508 | 4/2006 |
| WO | 2009/048418 | 4/2009 |

* cited by examiner

*Primary Examiner* — Phuc Tran
(74) *Attorney, Agent, or Firm* — Hamre, Schumann, Mueller & Larson, P.C.

(57) ABSTRACT

A method for generating a forbidden channel list for a combined wireless communication station comprises the steps of: obtaining a channel usage report from an access point; performing a channel scan procedure; generating at least one of a channel load report, a noise indicator report, a signal strength indicator report and a packet error rate report according to the results of the channel scan procedure; and generating a forbidden channel list at least according to the generated one of the channel usage report, the channel load report, the noise indicator report, the signal strength to report, and the packet error rate report.

16 Claims, 6 Drawing Sheets

METHOD AND APPARATUS FOR GENERATING FORBIDDEN CHANNEL LIST

BACKGROUND OF THE INVENTION

1. Field of the Invention

The present invention relates to a method and apparatus for generating a forbidden channel list for a combined wireless communication station.

2. Description of the Related Art

As wireless technology becomes more and more popular, a variety of wireless applications are rapidly developed. Nowadays, many researches are devoted to improving data transmission quality over wireless networks to meet the needs of those applications. The most common wireless protocols used at 2.4 GHz are IEEE 802.11 b/g and Bluetooth technology, both of which have great potential in wireless applications. Wireless local area network (WLAN) systems are developed based on IEEE 802.11 standard specifications, and are typically operated within a 100-meter range. Bluetooth systems, on the other hand, are usually used in the WPANs (wireless personal area network) within short distances, such as in a wireless computer mouse, keyboard, earphones, and other personal apparatus.

IEEE 802.11 b/g and Bluetooth modules both operate at 2.4 GHz ISM band. Although the modulation methods and the spread spectrum topology of two protocols are different, a collision of transmissions occurs and interference results when the transmissions of the IEEE 802.11 b/g modules and Bluetooth modules overlay in a nearby frequency band.

FIG 1 shows a frequency band usage condition. Referring to FIG 1, frequency bands of some of the hop channels used by the Bluetooth modules during a frequency hopping operation overlay the frequency bands used by other WLAN modules and causes interferences. The interference during the frequency hopping operation may be avoided if the Bluetooth modules can skip the frequency bands used by other WLAN modules.

FIG 2 shows another frequency band usage condition. Referring to FIG 2, frequency bands of the hop channels used by the Bluetooth modules during a frequency hopping operation do not overlay the frequency bands used by other WLAN modules, so that it can avoid the interference between the Bluetooth modules and the WLAN modules during the frequency hopping operation. In addition, to further avoid the frequency bands used by other WLAN modules, the Bluetooth module should also avoid selecting the channels with unqualified quality during the frequency hopping to operation.

There is a need to provide a method and apparatus for generating a forbidden channel list for a combined wireless communication station so that a Bluetooth module of the combined wireless communication station can exclude the channels shown in the forbidden channel list when selecting channels or when performing a frequency hopping operation.

SUMMARY OF THE INVENTION

A method and apparatus for generating a forbidden channel list are disclosed. The forbidden channel list generating apparatus and method of the present invention transmit a neighbor report request packet to an access point to obtain a channel usage report. In addition, the forbidden channel list generating apparatus and method obtain a channel load report, a noise indicator report, a signal strength indicator report or a packet error rate report by performing a channel scan procedure. Finally, the forbidden channel list generating apparatus and method generate a forbidden channel list according to the channel usage report, the channel load report, the noise indicator report, the signal strength report, the packet error rate report and the combination of the reports. Therefore, channels listed in the forbidden channel list can be excluded when the Bluetooth module performs a channel select operation or a frequency hopping operation. Even though the access point connected to the combined wireless communication station operates at 5 GHz frequency band, the forbidden channel list generating apparatus and method of the present invention can obtain channel usage conditions of other access points operated at the 2.4 GHz frequency band by transmitting a neighbor report request packet to the connected access point.

According to one embodiment of the present invention, a method for generating a forbidden channel list for a combined wireless communication station comprises the steps of: obtaining a channel usage report from an access point; performing a channel scan procedure; generating at least one of a channel load report, a noise indicator report, a signal strength indicator report or a packet error rate report according to the results of the channel to scan procedure; and generating a forbidden channel list according to the generated one of the channel usage report, the channel load report, the noise indicator report, the signal strength report, and the packet error rate report.

According to another embodiment of the present invention, a forbidden channel list generating apparatus for a combined wireless communication station comprising a first wireless communication module and a second wireless communication module comprises a transmitting unit, a receiving unit, a channel scan unit, and a list generating unit. The transmitting unit is configured to transmit a neighbor report request packet to an access point via the first wireless communication module. The receiving unit is configured to obtain a channel usage report from the access point via the first wireless communication module. The channel scan unit is configured to perform a channel scan procedure and to generate at least one of a channel load report, a noise indicator report, a signal strength indicator report or a packet error rate report according to the results of the channel scan procedure. The list generating unit is configured to generate a forbidden channel list according to the generated one of the channel usage report, the channel load report, the noise indicator report, the signal strength report, and the packet error rate report.

BRIEF DESCRIPTION OF THE DRAWINGS

The accompanying drawings illustrate several embodiments of the invention and, together with the description, serve to explain the principles of the invention. Those skilled in the art will recognize that the particular embodiments illustrated in the drawings are merely exemplary, and are not intended to limit the scope of the present invention.

PREFERRED EMBODIMENT OF THE PRESENT INVENTION

In this invention, a method and apparatus for generating a forbidden channel list are disclosed. Detailed operations and compositions are described below in order that this invention can be thoroughly understood. The embodiments of the invention do not limit the details, with which persons skilled in the field of wireless communications should be familiar. On the other hand, well-known compositions and operations are not described in detail to avoid unnecessary limitations of the invention. Preferred embodiments are described in detail as follows. In addition to these detailed descriptions, this invention can also be implemented widely in other embodiments. In addition, the scope of the present invention is not to be taken in a limiting sense, and is defined only by the appended claims.

Figure 1:
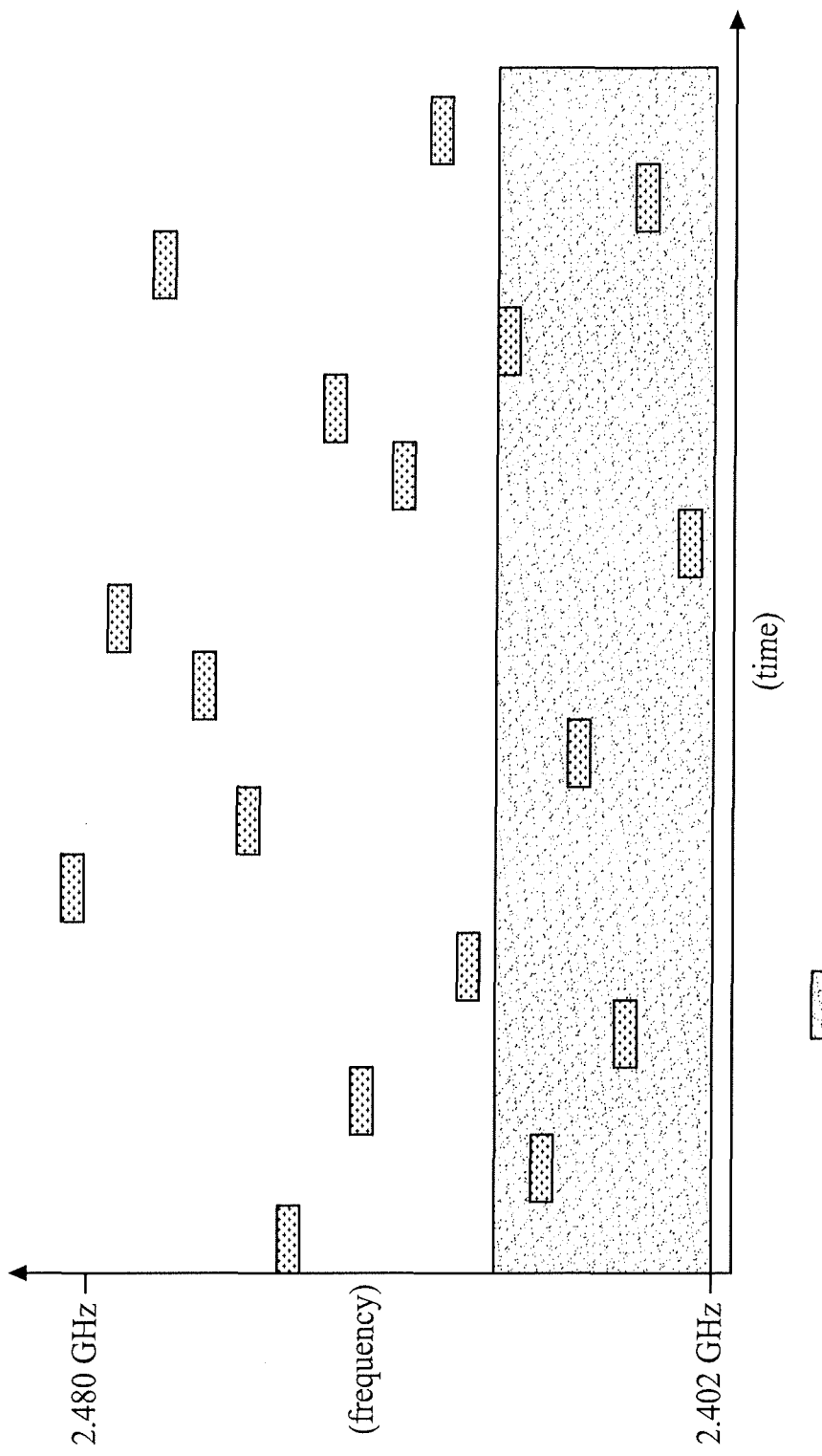
FIG 1 shows a frequency band usage condition.
Figure 2:
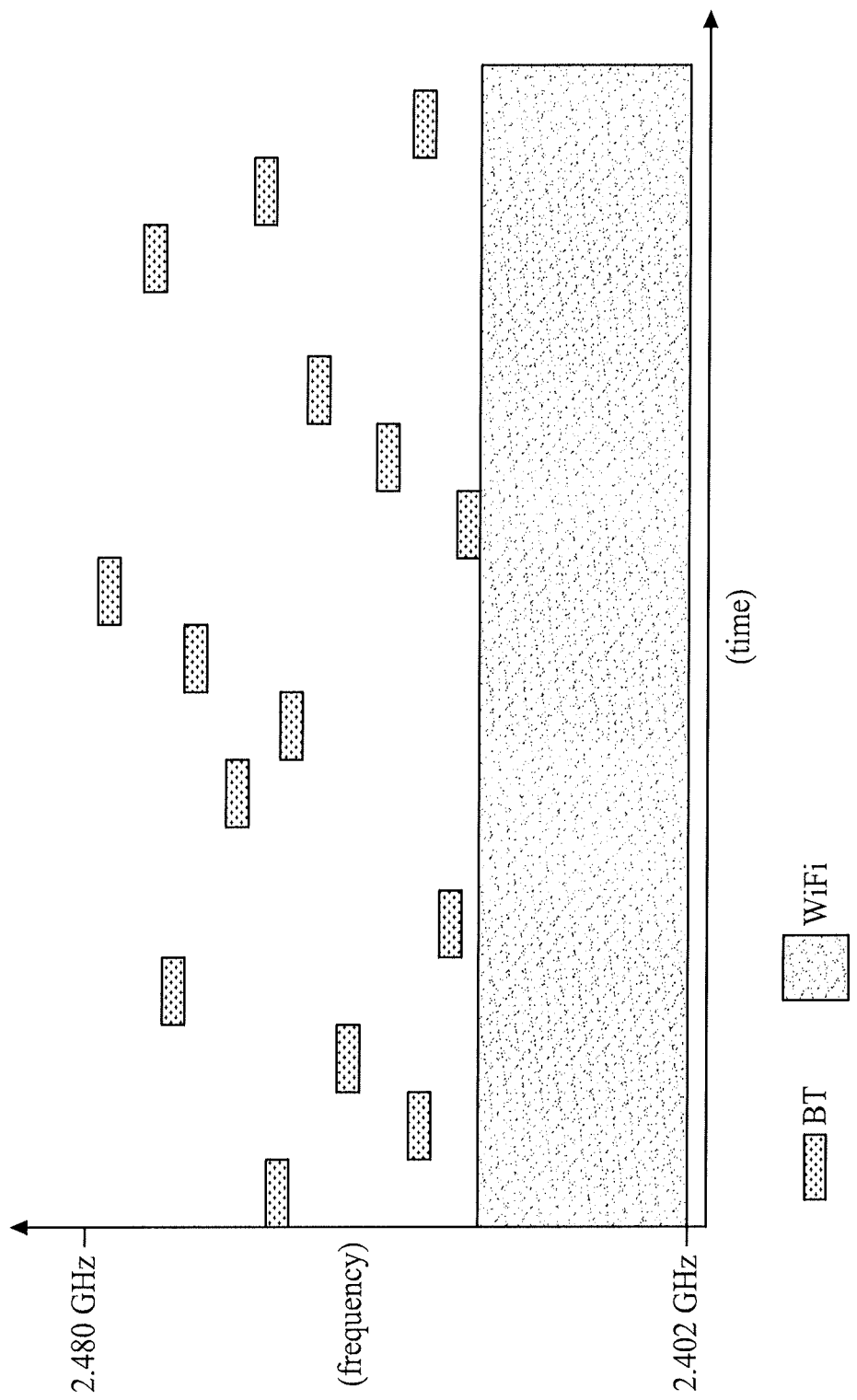
FIG 2 shows another frequency band usage condition.
Figure 3:
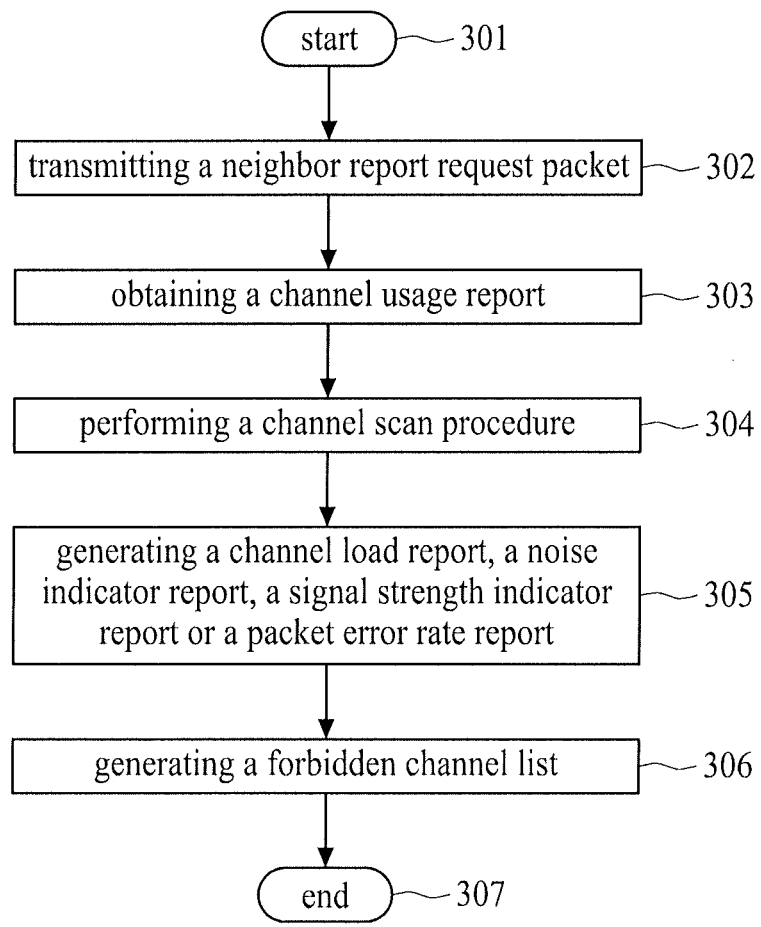
FIG 3 is a flowchart of a method for generating a forbidden channel list in accordance with an exemplary embodiment of the present invention.
Figure 4:
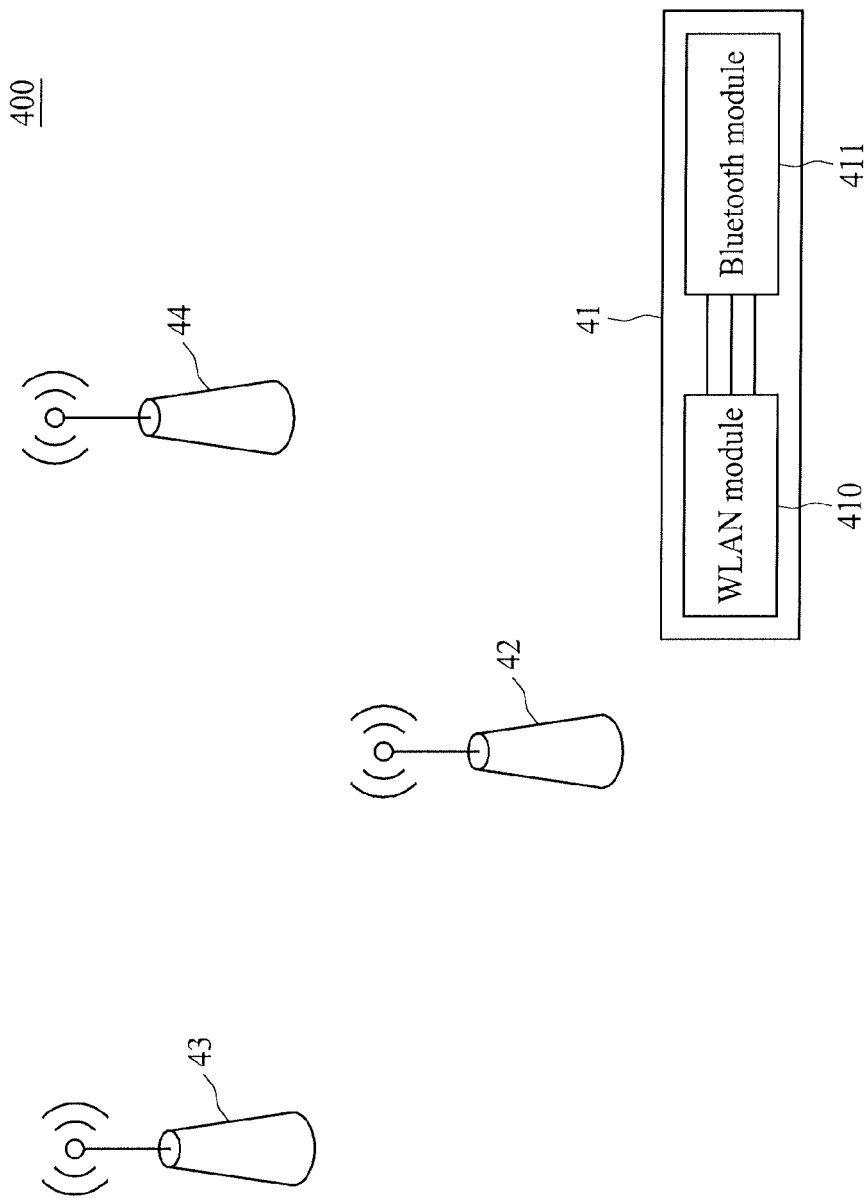
FIG 4 is a block diagram of a WLAN in accordance with another to exemplary embodiment of the present invention.

FIG 3 is a flowchart of a method for generating a forbidden channel list in accordance with an exemplary embodiment of the present invention. In one embodiment of the present invention, the method for generating a forbidden channel list can used in a combined wireless communication station in a WLAN. FIG 4 is a block diagram of a WLAN 400 in accordance with another exemplary embodiment of the present invention. The WLAN 400 comprises a combined wireless communication station 41 and access points 42, 43, 44. In one embodiment of the present invention, the access point 42 operates on channel 60 (5.3 GHz), the access point 43 operates on channel 1 (2.413 GHz), and the access point 44 operates on channel 7 (2.437 GHz). However, the present invention is not limited to the embodiment. The combined wireless communication station 41 currently communicates with the access point 42. The combined wireless communication station 41 comprises a WLAN module 410 and a Bluetooth module 411. In order to enable those skilled in the art to practice the present invention in accordance with the exemplary embodiment, FIG 3 and FIG 4 are utilized to describe the procedure of a method for generating a forbidden channel list.

The method starts from step 301. In step 302, the WLAN module 410 transmits a neighbor report request packet to the connected access point 42. In step 303, the WLAN module 410 obtains a channel usage report from the access point 42. The channel usage report comprises channels used by the access points 43 and 44, i.e., channel 1 and channel 7. In step 304, the WLAN module 410 performs a channel scan procedure. In one embodiment of the present invention, the WLAN module 410 scans channels, except channel 1 and channel 7, using the 2.4 MHZ ISM band. For example, the WLAN module 410 may scan channels 2 to 6 and channels 8 to 14. In step 305, a channel load report, a noise indicator report, a signal strength indicator report or a packet error rate report are generated according to the results of the channel scan procedure. The channel load report may comprise channel load conditions of the scanned channel. In one embodiment of the present invention, the noise indicator report can be an average noise power indicator report comprising the average noise power indicator of the scanned channels. In one embodiment of the present invention, the signal strength indicator report can be a received signal strength indicator (RSSI) report comprising the RSSI of the scanned channels. The packet error rate report comprises the packet error rate of the scanned channels. In step 306, a forbidden channel list is generated according to the generated channel usage report, the channel load report, the noise indicator report, the signal strength report and the packet error rate report. However, the forbidden channel list can be generated by other methods. For example, the forbidden channel list can be generated according to one of the aforementioned reports or portions of the aforementioned reports. In one embodiment of the present invention, the communication quality of the channel 10 (2.457 GHz) is determined as unqualified according to the results of the channel load report, the noise indicator report, the signal strength report and the packet error rate report. Therefore, the forbidden channel list generated in step 306 comprises channel 1, channel 2, and channel 10. In step 307, the flow of the method ends.

As mentioned above, the Bluetooth module 411 in the combined wireless communication station 41 would exclude channel 1, channel 2, and channel 10 shown in the forbidden channel list to avoid signal interference.

Figure 5:
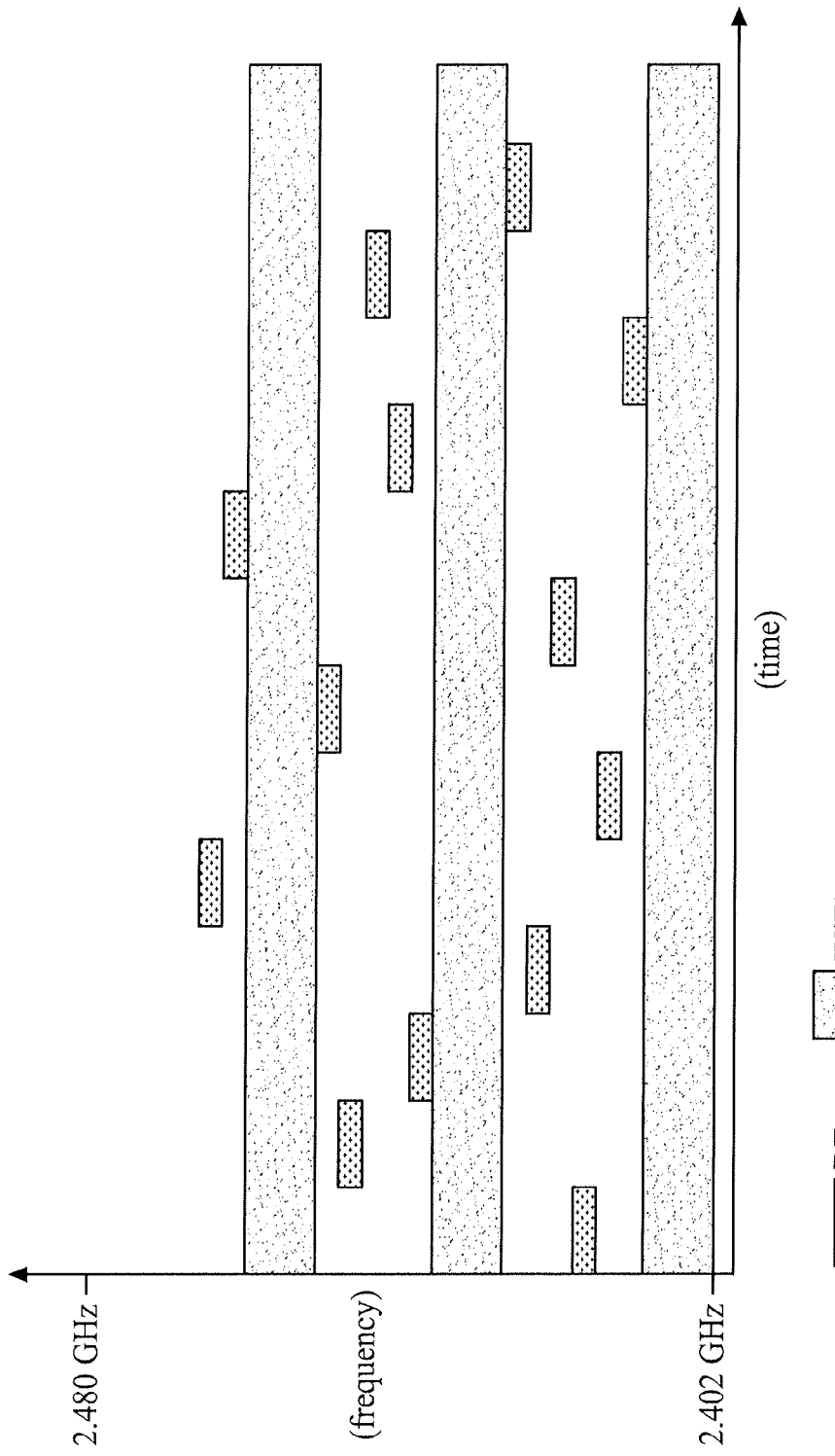
FIG 5 shows a frequency band usage condition in accordance with an exemplary embodiment of the present invention.

FIG 5 shows a frequency band usage condition. Referring to FIG 5, the Bluetooth module 411 avoids frequency bands used by channel 1, channel 2, and channel 10 during a frequency hopping operation to avoid signal interference.

Figure 6:
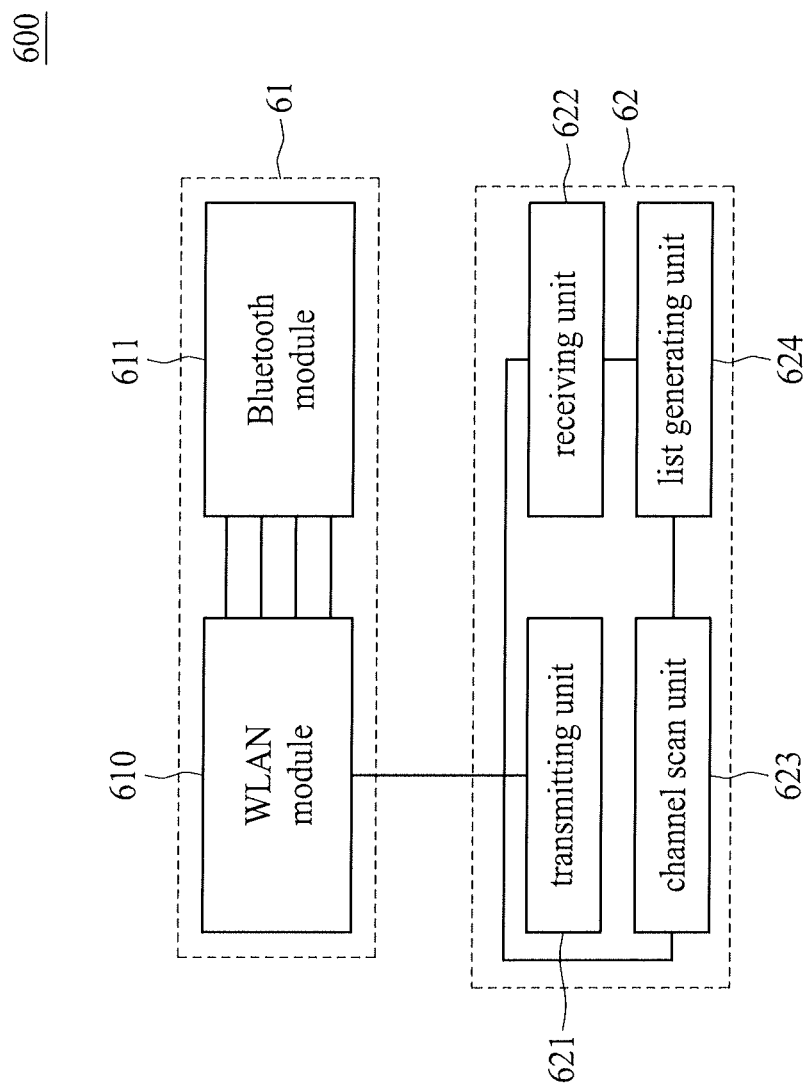
FIG 6 is a block diagram of a forbidden channel list generating apparatus for a combined wireless communication station in accordance with another exemplary embodiment of the present invention.

In order to enable those skilled in the art to practice the present invention in accordance with the exemplary embodiment, an apparatus for generating a forbidden channel list for a combined wireless communication station is provided hereinafter. FIG 6 is a block diagram of a forbidden channel list generating apparatus 62 for a combined wireless communication station 61 in accordance with another exemplary embodiment of the present invention. The combined wireless communication station 61 comprises a WLAN module 610 and a Bluetooth module 611. The forbidden channel list generating apparatus 62 comprises a transmitting unit 621, a receiving unit 622, a channel scan unit 623, and a list generating unit 624. The transmitting unit 621 transmits a neighbor report request packet to a connected access point via the WLAN module 610. The receiving unit 622 receives a channel usage report from the access point via the WLAN module 610. The channel scan unit 623 performs a channel scan procedure and generates a channel load report, a noise indicator report, a signal strength indicator report or a packet error rate report according to the results of the channel scan procedure. In one embodiment of the present invention, the noise indicator report is an average noise power indicator report, and the signal strength indicator report is a received signal strength indicator (RSSI) report. The list generating unit 624 generates a forbidden channel list according to the channel usage report, the channel load report, the noise indicator report, the signal strength report or the packet error rate report. In another embodiment of the present invention, the list generating unit 624 can generate the forbidden channel list according to all of the aforementioned reports, one of the aforementioned reports, or portions of the aforementioned reports. The forbidden channel list generating apparatus 62 in accordance with the present invention can take the form of a hardware-only implementation, a software-only implementation, or an implementation containing both hardware and software. In addition, the forbidden channel list generating apparatus 62 is implemented in a platform comprising a single processor or multiple processors.

The forbidden channel list generating apparatus and method of the present invention transmit a neighbor report request packet to an access point to obtain a channel usage report. In addition, the forbidden channel list generating apparatus and method obtain a channel load report, a noise indicator report, a signal strength indicator report or a packet error rate report by performing a channel scan procedure. Finally, the forbidden channel list generating apparatus and method generate a forbidden channel list according to the channel usage report, the channel load report, the noise indicator report, the signal strength report, the packet error rate report and the combination of the reports. Therefore, channels listed in the forbidden channel list can be excluded when the Bluetooth module performs a channel select operation or performs a frequency hopping operation. Even though the access point connected to the combined wireless communication station operates at 5 GHz frequency band, the forbidden channel list generating apparatus and method of the present invention can obtain channel usage conditions of other access points operated at the 2.4 GHz frequency band by transmitting a neighbor report requires packet to the connected access point.

The above-described embodiments of the present invention are to intended to be illustrative only. Numerous alternative embodiments may be devised by persons skilled in the art without departing from the scope of the following claims.

What is claimed is:

1. A method for generating a forbidden channel list for a combined wireless communication station, comprising:
    obtaining a channel usage report from an access point;
    performing a channel scan procedure;
    generating at least one of a channel load report, a noise indicator report, a signal strength indicator report or a packet error rate report according to the results of the channel scan procedure; and
    generating a forbidden channel list for a first wireless communication module in the combined wireless communication station according to the generated one of the channel usage report, the channel load report, the noise indicator report, the signal strength report, and the packet error rate report;
    wherein the combined wireless communication station includes the first wireless communication module and a second wireless communication module.

2. The method of claim 1, further comprising the step of: transmitting a neighbor report request packet to the access point.

3. The method of claim 1, wherein the first wireless communication module is a wireless local area network (WLAN) module.

4. The method of claim 1, wherein the first wireless communication module is a Bluetooth module.

5. The method of claim 1, further comprising the step of: transmitting a neighbor report request packet to the access point, wherein the first wireless communication module transmits the neighbor report request packet to the access point.

6. The method of claim 1, wherein the first wireless communication module performs the channel scan procedure.

7. The method of claim 1, wherein the noise indicator report is an average noise power indicator report.

8. The method of claim 1, wherein the signal strength indicator report is a received signal strength indicator (RSSI) report.

9. A forbidden channel list generating apparatus for a combined wireless communication station comprises a first wireless communication module and a second wireless communication module, the apparatus comprising:
    a transmitting unit configured to transmit a neighbor report request packet to an access point via the first wireless communication module;
    a receiving unit configured to obtain a channel usage report from the access point via the first wireless communication module;
    a channel scan unit configured to perform a channel scan procedure and to generate at least one of a channel load report, a noise indicator report, a signal strength indicator report and a packet error rate report according to the results of the channel scan procedure; and
    a list generating unit configured to generate a forbidden channel list for the first wireless communication module in the combined wireless communication station according to the generated one of the channel usage report, the channel load report, the noise indicator report, the signal strength report and the packet error rate report.

10. The apparatus of claim 9, wherein the first wireless communication module is a wireless local area network (WLAN) module.

11. The apparatus of claim 9, wherein the first wireless communication module is a Bluetooth module.

12. The apparatus of claim 9, wherein the noise indicator report is an average noise power indicator report.

13. The apparatus of claim 9, wherein the signal strength indicator report is a received signal strength indicator (RSSI) report.

14. The apparatus of claim 9, wherein the forbidden channel list generating apparatus is implemented as software, firmware or hardware.

15. The apparatus of claim 9, wherein the forbidden channel list generating apparatus is implemented in a platform comprising a single processor or multiple processors.

16. A method for generating a forbidden channel list for a combined wireless communication station, comprising:
    obtaining a channel usage report from an access point;
    performing a channel scan procedure;
    generating at least one of a channel load report, a noise indicator report, a signal strength indicator report or a packet error rate report according to the results of the channel scan procedure; and
    generating a forbidden channel list for a Bluetooth module in the combined wireless communication station according to the generated one of the channel usage report, the channel load report, the noise indicator report, the signal strength report, and the packet error rate report;
    wherein the combined wireless communication includes a wireless local area network (WLAN) module and the Bluetooth module.

* * * * *